United States Patent [19]
Brienza et al.

[11] 3,943,464
[45] Mar. 9, 1976

[54] MODULATOR FOR ELECTRICAL SIGNALS PROCESSED IN A LASER-ACOUSTIC DELAY LINE

[75] Inventors: Michael J. Brienza, Westport; Frederik Weindling, Stamford, both of Conn.

[73] Assignee: United Technologies Corporation, Hartford, Conn.

[22] Filed: Aug. 30, 1973

[21] Appl. No.: 392,893

Related U.S. Application Data

[63] Continuation-in-part of Ser. No. 244,498, April 29, 1972, abandoned.

[52] U.S. Cl. ......... 332/7.51; 350/160 R; 343/17.1 R
[51] Int. Cl.² ....................... G02F 1/18; H01J 3/14
[58] Field of Search ........... 332/7.51; 350/150, 160, 350/161; 250/199, 216; 307/88.3; 35/10.4; 343/17.1; 324/77 K, 77 I

[56] References Cited
UNITED STATES PATENTS

| | | | |
|---|---|---|---|
| 2,943,315 | 6/1960 | Rosenthal | 343/17.1 |
| 3,055,258 | 9/1962 | Nurvitz | 332/7.51 |
| 3,088,113 | 4/1963 | Rosenthal | 343/17.1 |
| 3,539,245 | 11/1970 | Brienza | 350/161 |
| 3,544,806 | 12/1970 | DeMaria et al. | 308/88.3 |
| 3,571,507 | 3/1971 | Korpel | 350/160 |
| 3,573,449 | 4/1971 | Maloney | 250/216 |
| 3,700,910 | 10/1972 | Smith | 250/216 |
| 3,745,353 | 7/1973 | Jernigan et al. | 250/216 |
| 3,821,548 | 6/1974 | Jernigan | 250/216 |

*Primary Examiner*—Maynard R. Wilbur
*Assistant Examiner*—N. Moskowitz
*Attorney, Agent, or Firm*—M. P. Williams

[57] ABSTRACT

Either of two beams of coherent light has components which are phase shifted and/or attenuated; the phase shifting is alternatively provided in different embodiments by (a) transmitting the coherent light through a phase plate (which may be of variable opacity); (b) processing the coherent light in a second laser-acoustic delay line through which an acoustic wave has been transmitted, or (c) providing in the laser acoustic delay line two acoustic traveling waves, one of which interacts at the Bragg angle with the coherent light. An interaction at the Bragg angle between either of the light beams and a traveling wave generated in a laseracoustic delay line by an electrical rf signal provides a diffracted light beam having a frequency equal to the sum of the light beam frequency and that of the rf signal. A photodetector heterodynes the two light beams thereby providing a modulated rf signal with phase or amplitude modulation in accordance with the phase shift or attenuation of either of the light beams.

5 Claims, 6 Drawing Figures

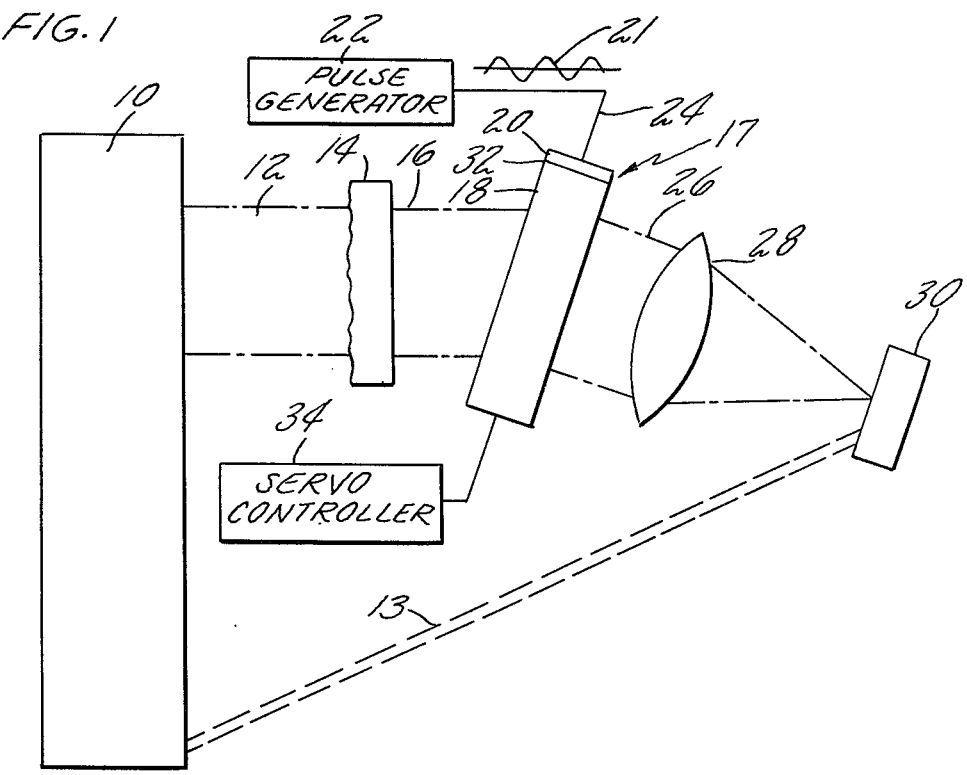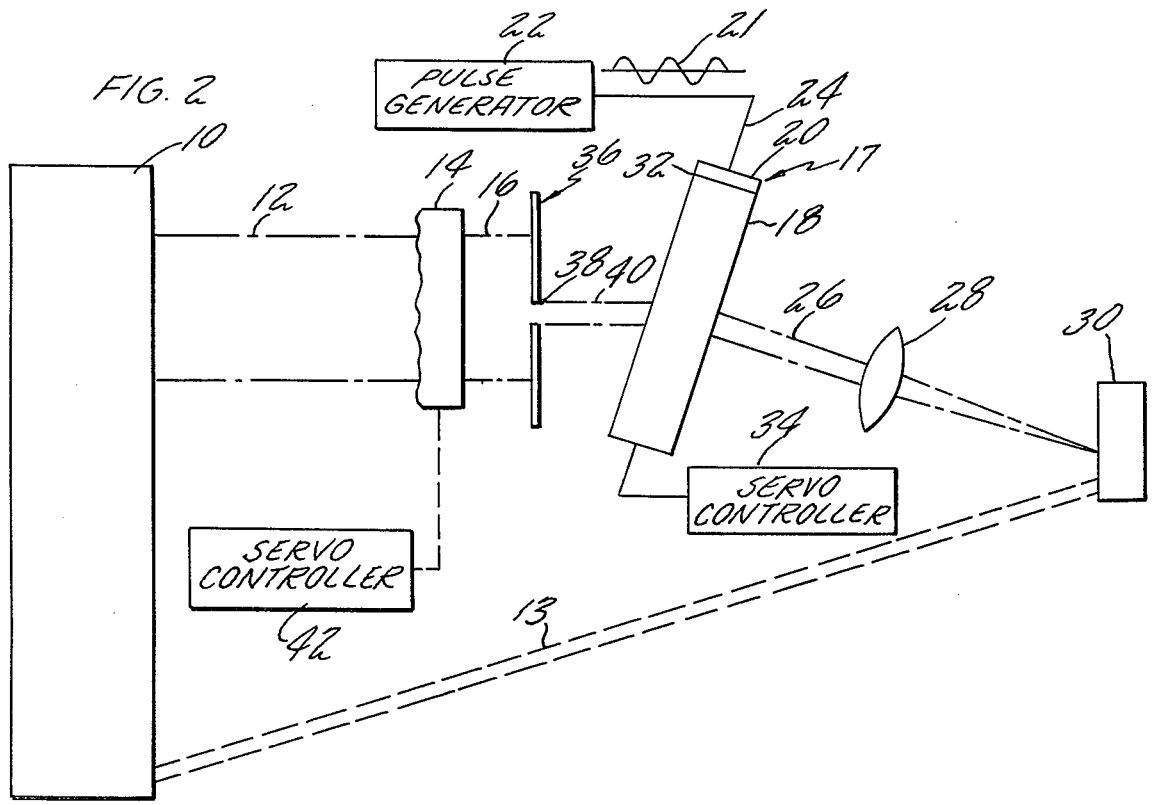

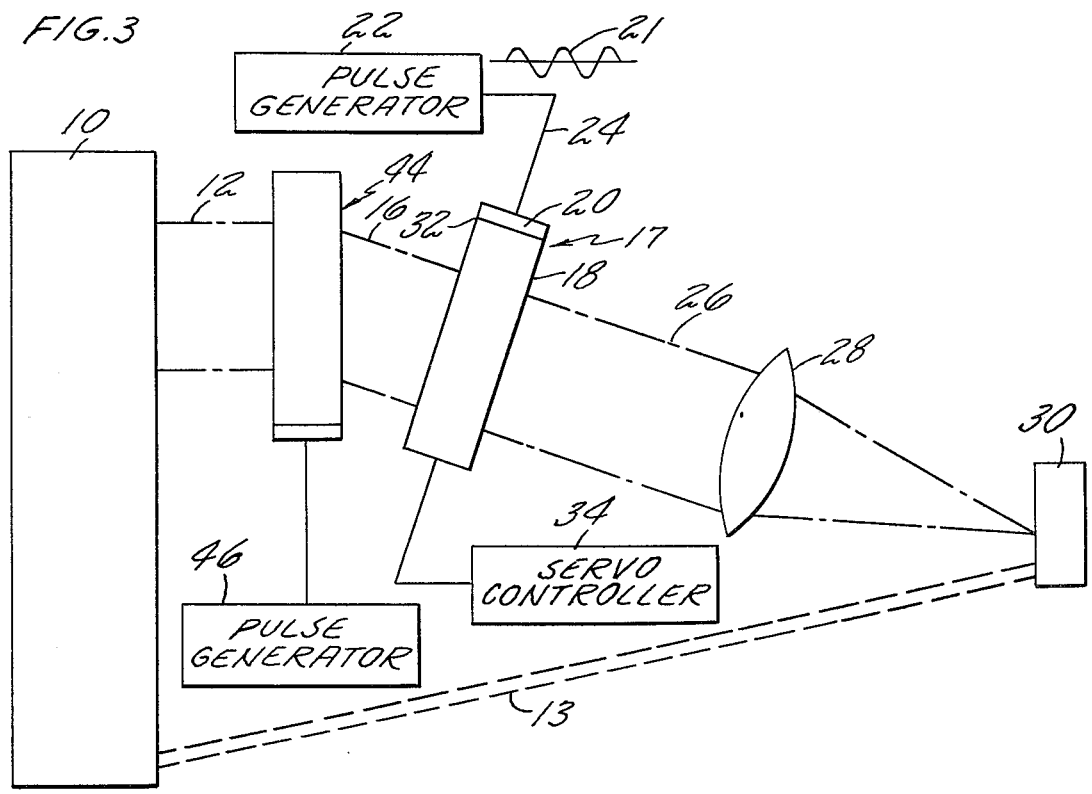
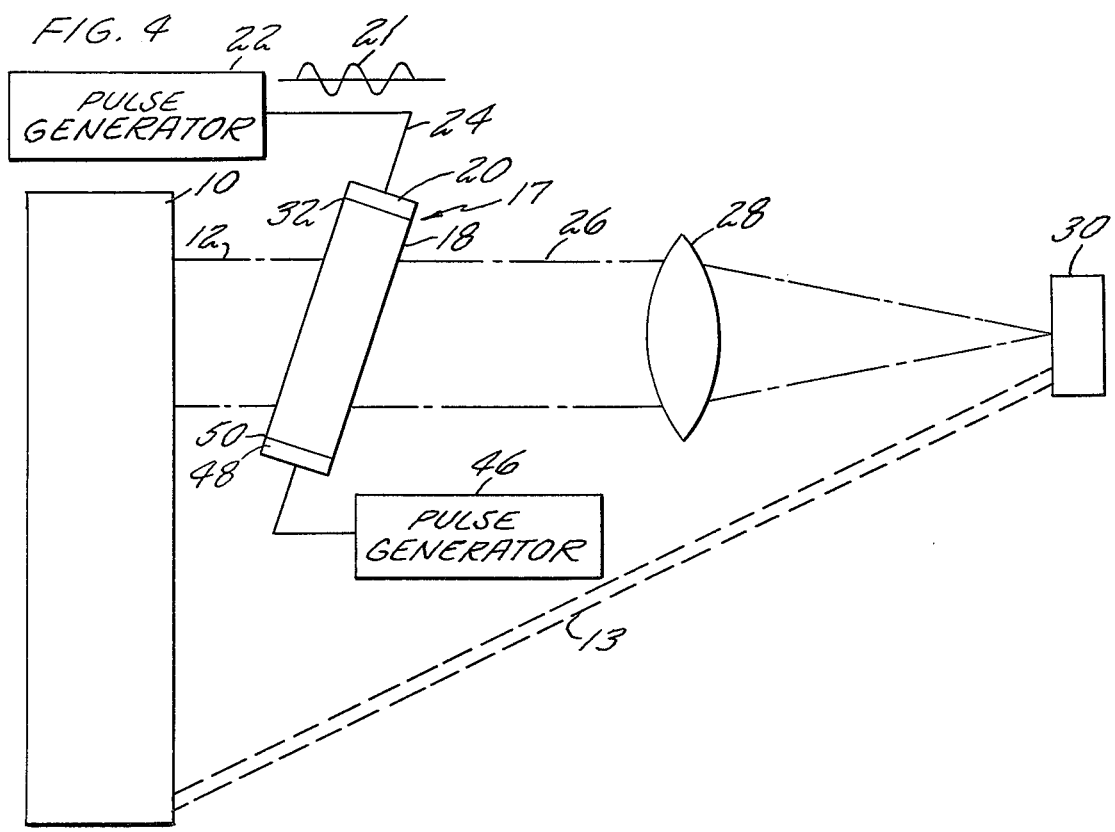

MODULATOR FOR ELECTRICAL SIGNALS PROCESSED IN A LASER-ACOUSTIC DELAY LINE

This is a continuation-in-part of an application Ser. No. 244,498, filed on Apr. 29, 1972, now abandoned.

BACKGROUND OF THE INVENTION

1. Field of the Invention

This invention relates to acousto-optical signal processing and more particularly to acousto-optical means for modulating electrical signals.

2. Description of the Prior Art

Simulation of the transmitted radar pulse and a target return signal is most often provided by generating a pulse modulated carrier in a delay line in response to a simulated radar transmission pulse. A delayed pulse provided by the delay line simulates the target return signal. Therefore, simulation of a target signal representative of a single point target at an arbitrary distance (range) from a radar apparatus is minimal in its complexity. Target signals from point targets, however, are atypical of signals received from actual radar targets. Typical radar targets may include combinations of chaff, extended targets and multiple targets.

A target signal received from an extended target may be phase modulated and of longer duration than the transmitted pulse. When the target is large and there is a variation of the range of different parts of the target, there may be a difference of time between the arrival at the radar antenna of portions of the target signal reflected from the different parts of the target, thereby causing a frequency modulation of the carrier and an elongation of the target signal.

Chaff and multiple targets provide a multiplicity of target signals in response to a single transmitted pulse. A realistic simulation of multiple target signals requires a simulated target signal corresponding to each target, the range of each target being associated with the time interval between the generation of a simulated transmitted pulse and the generation of a simulated target signal; the phase modulation and elongation of each target signal caused by the size of the corresponding target must also be simulated.

Movement of a target, towards or away from the radar antenna, frequency modulates the carrier of the target signal thereby causing a Doppler frequency shift of the carrier frequency; the Doppler shift must be provided in a realistic simulation which includes the movement of a target.

The inventions of Brienza disclosed in U.S. Pat. Nos. 3,463,573; 3,539,245 and 3,644,742 and DeMaria et al in U.S. Pat. Nos. 3,544,806; 3,517,332; 3,485,559 and 3,566,303, all assigned to the same assignee, describe how an electrical input signal may be processed by acousto-optical interaction whereby a processed electrical output signal is provided. These patents do not disclose a means for phase modulating the electrical signal which, for reasons explained hereinbefore, is required in applications such as the realistic simulation of coherent radar return signals.

A simulation of radar signals typically received by a radar receiver has not been known in the prior art because apparatus of great complexity has heretofore been required for a realistic simulation. One aspect of the present invention relates to the phase modulation of electrical signals whereby radar signals may be readily simulated.

SUMMARY OF THE INVENTION

An object of the present invention is to provide improved apparatus for simulating radar target signals.

A further object of the present invention is the provision of apparatus for providing combinations of phase, frequency and amplitude modulation of an electrical signal.

According to the present invention, an encoded beam of coherent light, comprising components which are phase shifted and attenuated in a manner varying with time, is received along the axis of acoustic propagation of a laser-acoustic delay line at a location which may vary with time; a coherent rf signal is applied to the delay line causing an acoustic traveling wave to be propagated therethrough; interaction at the Bragg angle between the encoded beam and the acoustic wave provides a diffracted light beam; heterodyning a coherent reference beam with the diffracted beam provides the rf signal with phase, frequency and amplitude modulation; the phase and amplitude modulation are in accordance with the phase shift and attenuation respectively of the components of the encoded beam; the frequency modulation is in accordance with the variation of the location of reception on said delay line.

The present invention provides for a realistic simulation of radar target signals.

The present invention provides apparatus for modulation of an rf signal being processed in a laser-acoustic delay line; an arbitrary time varying pattern of phase, frequency and amplitude modulation is provided.

Other objects, features and advantages of the present invention will become more apparent in the light of the following detailed description of preferred embodiments thereof as illustrated in the accompanying drawing.

BRIEF DESCRIPTION OF THE DRAWING

FIG. 1 is a schematic block diagram of a first embodiment of the invention that incorporates a phase plate;

FIG. 2 is a schematic block diagram of a second embodiment that incorporates a movable phase plate and an opaque slotted plate;

FIG. 3 is a schematic block diagram of a third embodiment that incorporates an acousto-optical delay line;

FIG. 4 is a schematic block diagram of a fourth embodiment using a single acousto-optical delay line.

DESCRIPTION OF THE PREFERRED EMBODIMENT

Figure 5:
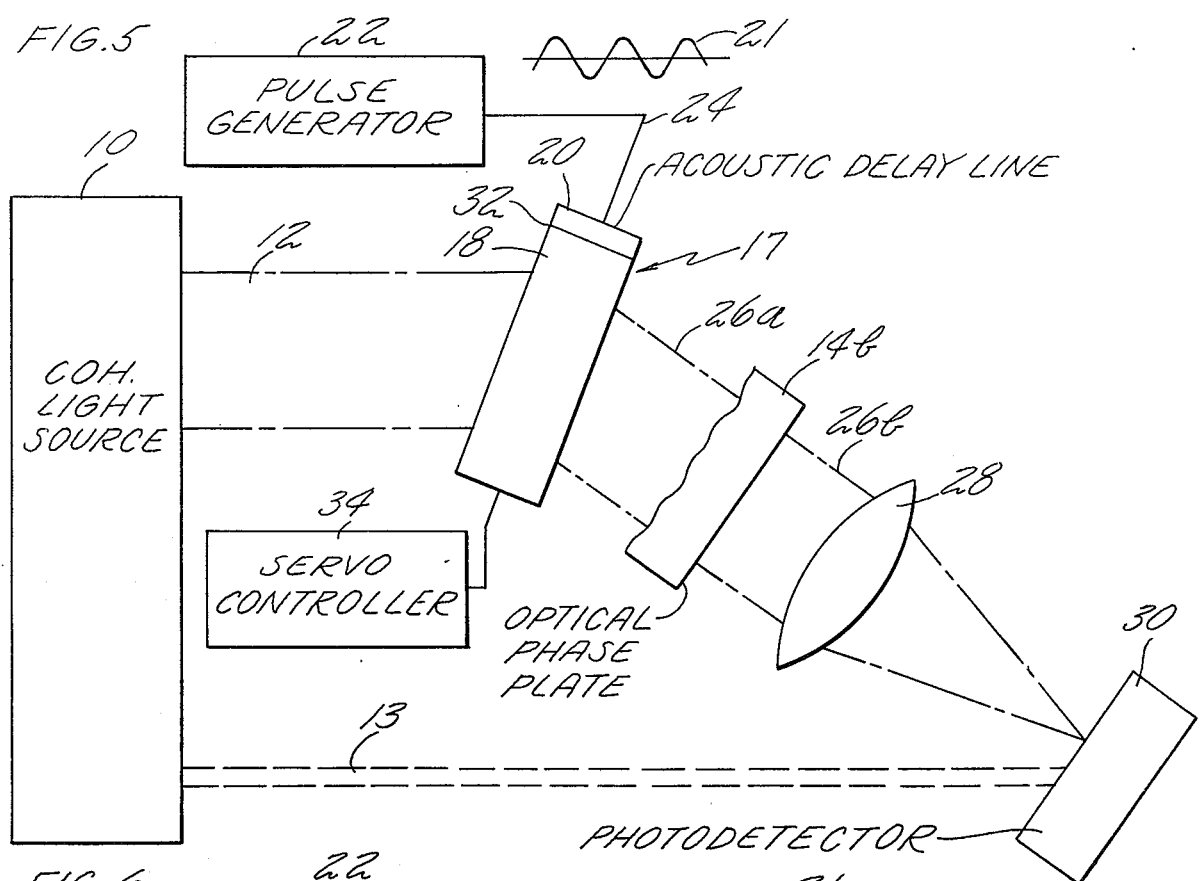
FIGS. 5 and 6 are schematic block diagrams showing alternative disposition of modulators with respect to the embodiment of FIG. 1.

Referring now to FIG. 1, in a first embodiment of the present invention a source of coherent light 10 comprising a laser apparatus, or any other suitable means, provides a collimated coherent light beam 12 and a coherent reference beam 13, both of an optical frequency $f_o$. An optical phase plate 14, having an encoding pattern of construction causes a phase shift of components of the beam 12 in accordance with the pattern, whereby a phase encoded beam 16 consisting of phase shifted components is provided. The phase plate 14 may be a glass plate of variable thickness or any other suitable means for altering the phase of the components of the beam 12.

A laser-acoustic delay line 17, comprising an acoustic cell 18 and an acoustic transducer 20, is disposed to receive components of the encoded beam 16 at locations along the axis of acoustic propagation of the cell 18. A suitable signal source, such as a pulse generator 22, provides on a signal line 24 a radio frequency (called rf, hereinafter) pulse 21 having a carrier frequency $f_s$ (typically, $f_s$ is above 100 megahertz). An acoustic wave, of the same duration and frequency as the rf pulse 21, is propagated along the axis of acoustic propagation of the cell 18 when the transducer 20 is actuated by the rf pulse 21. The cell 18 and the transducer 20 may be of the type disclosed in the aforementioned U.S. Pat. No. 3,463,573. As the acoustic wave propagates through the delay line 17 it acts as a moving diffraction grating, providing a diffracted component of light in response to interaction at the Bragg angle between the acoustic wave and a component of the encoded beam 16. Accordingly, diffracted beam components 26 result from the successive interaction of the acoustic wave and components of the beam 16. In this embodiment, the diffraction causes frequency modulation of each of the beam components 26, whereby each modulated component has a frequency equal to the sum of $f_o$ and $f_s$ (other embodiments may provide modulated beam components having a frequency equal to the difference of $f_o$ and $f_s$). A focusing lens 28 successively focuses each of the diffracted beam components 26. A photodetector 30 is disposed to receive and heterodyne the beam 13 with the focused beam components 26. Heterodyning causes the photodetector 30 to provide an output pulse which includes a difference signal having a frequency ($f_s$) equal to the difference between the frequencies of the reference beam 13 ($f_o$) and the beam components 26 ($f_o + f_s$). The phase of the difference signal has a modulation corresponding to the encoded pattern of the phase plate 14. In accordance with one aspect of the present invention, the phase modulation of the difference signal provided by the photodetector 30 corresponds to the code of the encoded beam 16. It should be understood that the phase plate 14 may be of variable opacity, thereby causing a selective attenuation as well as a phase shift of the components of the beam 12. An encoded beam 16 having selective attenuation causes an amplitude modulation of the difference signal.

The invention may be used to realistically simulate coherent radar target signals received by a radar antenna in a plethora of environmental conditions, with the pulse 21 being a simulated transmitted radar pulse. A single target may be simulated by rendering the phase plate 14 opaque except for a narrow slot having its width co-aligned with the axis of acoustic propagation. The size of the target is determined by the length along the axis of acoustic propagation receiving light from the slot. The width of the slot is therefore representative of the size of the target (associated with the elongation of the target signal). At a displacement from one end 32 of the cell 18 there is an interaction of a portion of the encoded beam 16 which had passed through the slot. The displacement from the end 32 is associated with the simulated target range (the time for propagation of an acoustic wave from the end 32 to the area of interaction).

A plurality of targets are simulated by rendering the phase plate 14 opaque except for a plurality of narrow disjunctive slots.

Chaff may be simulated by varying the opacity of portions of the phase plate 14 thereby causing components of the encoded beam 16 to have varying attenuation when received by the delay line 17. Because of the varying attenuation, the amplitude of the difference signal is accordingly varied to thereby resemble a target signal from chaff. A Doppler frequency shift of the carrier frequency of a target signal is simulated by continously varying the displacement of the delay line 17 along its axis of acoustic propagation, causing a variation of location of the interaction of the encoded beam (or alternatively, varying the displacement of the phase plate 14 along a line parallel to the direction of the acoustic wave) in a manner representative of the motion of a target towards or away from the radar antenna. The Doppler shift is directly proportional to the rate of change of the position of the delay line 17, as disclosed in the aforementioned U.S. Pat. No. 3,539,245. A servo controller 34 upon which the delay line 17 is mounted, or any other suitable means, may be used to impart an axial motion providing a desired rate of change of the position.

A composite target signal is associated with a target having a Doppler signature as well as a range.

Providing a target Doppler signature requires, in addition to the Doppler shift, the simulation of the modulation of the radar signal caused by different portions of the target being at different ranges and having different rates of change of range. The modulation may be performed by providing a fixed encoding pattern or one that varies as a function of time within the slot. Referring now to FIG. 2, in a second embodiment of the present invention, an opaque slotted plate 36 is disposed to intercept the encoded beam 16. A slot 38 in the opaque plate 36 transmits therethrough portions of the encoded beam 16. An encoded beam of light 40 from the slot 38 is incident upon the cell 18 whereby a diffracted beam 26 is provided as described hereinbefore. A servo controller 42 imparts motion to the phase plate 14 (having variable thickness and opacity) thereby causing the phase shift and the attenuation of the beam 40 to change as a function of time. The changes cause a modulation of the encoding pattern that may be used to simulate the modulation of the radar signal caused by different portions of the target being at different ranges, having different rates of change of range and characteristics which cause variations in the amplitude of the target signal.

Referring now to FIG. 3, in a third embodiment of the present invention, an encoding delay line 44, similar to the delay line 17, receives the coherent light beam 12. A pulse generator 46 which is connected to the delay line 44 causes an acoustic wave to be transmitted therethrough in the manner described hereinbefore. The acoustic wave and the coherent beam 12 interact at the Bragg angle thereby providing the encoded beam 16.

Referring to FIG. 4, in a fourth embodiment of the present invention a transducer 48 is mounted upon the end 50 of the delay line 17. The pulse generator 46 connected thereto causes transmission of an acoustic wave through the delay line 17 towards the transducer 20 thereby causing a diffraction and hence an encoding of the beam is provided within the delay line 17. The pulse generator 32 which causes an acoustic wave to be transmitted towards the transducer 48 causes a diffraction of the encoded beam whereby the diffracted beam 26 is provided.

Figure 6:
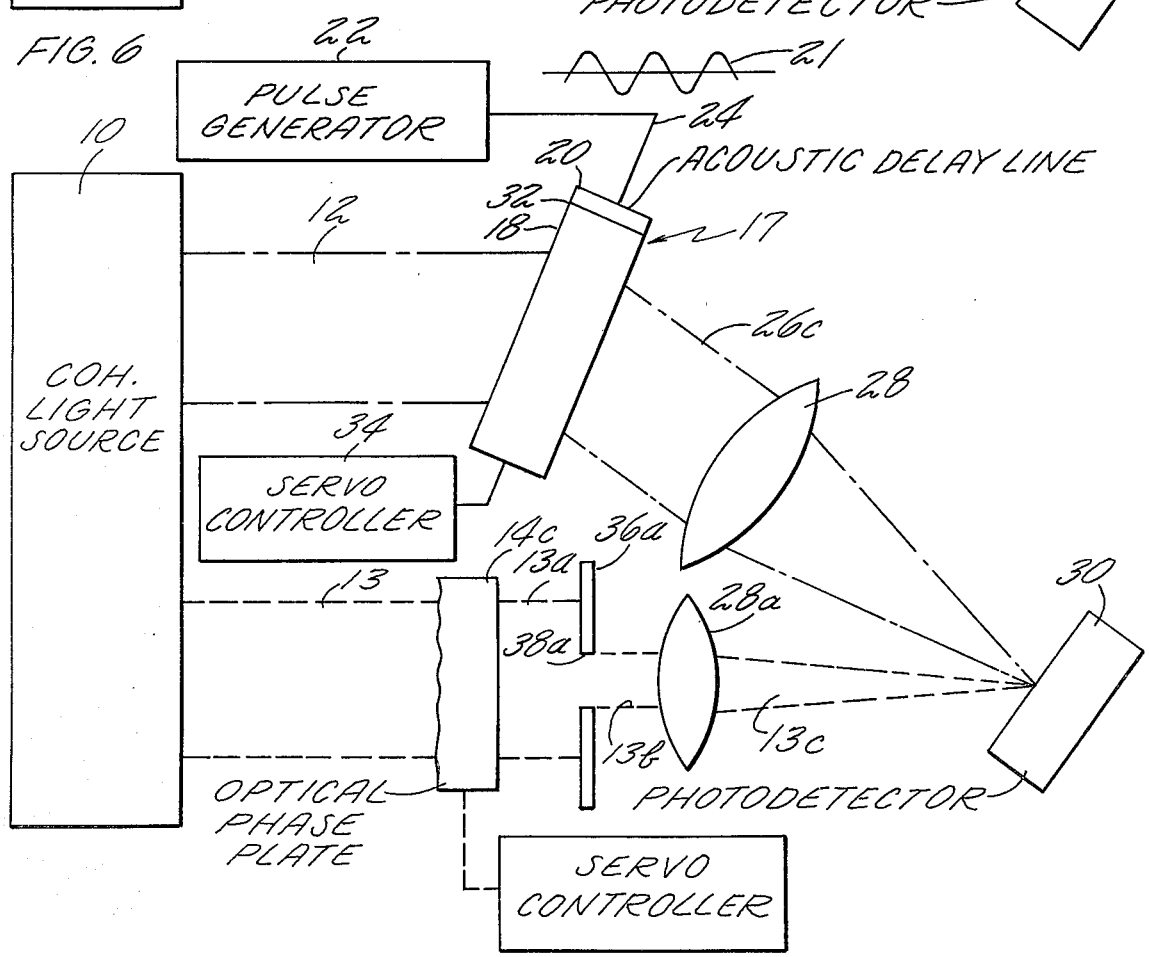

Because of the fact that the present invention will provide at the detector 30 an electric signal which is simply the difference between all of the components of frequency and phase of the two optical beams which are heterodyned thereon, the relative placement of the various optical modulators is extremely flexible. Considering the embodiment of FIG. 1, the same result may be achieved even though the optical phase plate 14 is placed after the laser-acoustic delay line 17 as illustrated in FIG. 5, such that the beam components 26a are at a frequency equal to the summation of the laser frequency and the frequency of the pulse 21, but does not include the phase modulation as do the beam components 26 in FIG. 1. However, once passing through the optical phase plate 14b, the beam components 26b emanating therefrom do include the phase shifts caused by the optical phase plate 14b. Similarly, the same phase shifts may be introduced into the reference beam 13 of FIG. 1 as is illustrated in FIG. 6. Therein, the reference beam 13 is applied to the phase plate 14c may be moved by a servo controller 42a (in the same fashion as is fully described with respect to FIG. 2 hereinbefore) so as to provide variable modulation in the beam 13a, which has a portion thereof selected by a slot 38a in an opaque plate 36a thereby to provide a narrow beam 13b which is phase modulated with respect to time, which when focused by a lens 28a is heterodyned with the beam 26c that does not have any code plate modulation in it. The heterodyning of the two beams will provide the same electric signal at the rf frequency of the pulse generator 22 (or other source) where the phase components introduced by the laser-acoustic delay line 17 and the phase modulation of the servoed code plate 14c, in precisely the same fashion as does the embodiment of FIG. 2. In other words, any two mutually-coherent light beams (or more) having different phase, amplitude or frequency components in modulation imposed thereon may be heterodyned and detected so as to provide an electric signal reflecting the differences between the heterodyned coherent light beams.

Although the invention has been shown and described with respect to preferred embodiments thereof, it should be understood by those skilled in the art that the foregoing and various other changes and omissions in the form and detail thereof may be made therein without departing from the spirit and scope of the invention.

Having thus described a typical embodiment of our invention, that which we claim as new and desire to secure by Letters Patent of the United States is:

1. Apparatus employing coherent light beams for processing an electrical signal provided by an electrical signal source, comprising:
    means for heterodyning beams of light on a plurality of paths with each other to provide an electrical output signal having characteristics defined by differences between the heterodyned beams;
    a source of coherent light providing a plurality of beams along respective paths to said heterodyning means;
    optical means disposed in one of said paths to receive components of coherent light of the corresponding beam for phase shifting selected components thereof according to an encoding pattern thereby providing a phase modulated light beam in the related path;
    a laser-acoustic processing delay line having at one end a transducer connected to the electrical signal source for generating an acoustic traveling wave along an axis of said processing delay line, said processing delay line being disposed in one of said paths to receive the related beam at the Bragg angle to said axis at a location thereon, a diffracted light beam being provided in response to interaction between the related beam and said acoustic wave; and
    means for providing continuous, non-incremental moving of said optical means with respect to the related one of said paths, thereby providing a time varying phase modulation of the light beam in the related path.

2. Apparatus according to claim 1 wherein said optical means additionally comprises means for attenuating the selected components.

3. Apparatus according to claim 1 wherein said optical means comprises an optical phase plate, portions of said phase plate having varying opacity, thereby providing phase shifted components of light attenuated in accordance with said opacity.

4. Apparatus according to claim 1 wherein said optical means additionally comprises an opaque slotted plate disposed to intercept said encoded beam, a portion of said encoded beam being transmitted through the slot in said opaque plate to said location, whereby the phase shift of said portion is changed in accordance with movement of the phase plate.

5. In the method of utilizing coherent light in processing an electrical signal, the steps of:
    directing a plurality of mutually coherent light beams along respective paths;
    providing a laser-acoustic delay line having an electric signal applied thereto thereby generating an acoustic wave along an axis of said laser-acoustic delay line at the Bragg angle to said axis, interaction at the Bragg angle of the acoustic wave with the related beam generating a diffracted beam;
    directing one of said beams through an optical modulator;
    heterodyning said beams together to provide an electrical signal having characteristics determined by said acoustic wave and said optical modulator; and
    causing continuous, non-incremental movement of said optical modulator to provide phase shift and attenuation to the beam varying continuously as a function of time.

* * * * *